United States Patent
Ito et al.

(10) Patent No.: US 10,344,161 B2
(45) Date of Patent: Jul. 9, 2019

(54) POLYLACTIC ACID COMPOSITION AND STRETCH-MOLDED BOTTLE MOLDED USING SAME

(71) Applicant: TOYO SEIKAN CO., LTD., Tokyo (JP)

(72) Inventors: Takuro Ito, Yokohama (JP); Hiroaki Sugioka, Yokohama (JP); Takahiro Okubo, Yokohama (JP); Satoru Kito, Yokohama (JP); Junko Tanabe, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 277 days.

(21) Appl. No.: 15/502,796

(22) PCT Filed: Aug. 6, 2015

(86) PCT No.: PCT/JP2015/072348
§ 371 (c)(1),
(2) Date: Feb. 9, 2017

(87) PCT Pub. No.: WO2016/024517
PCT Pub. Date: Feb. 18, 2016

(65) Prior Publication Data
US 2017/0233568 A1    Aug. 17, 2017

(30) Foreign Application Priority Data

Aug. 13, 2014   (JP) .................................. 2014-164862

(51) Int. Cl.
*C08L 67/04*    (2006.01)
*B32B 9/00*    (2006.01)
(Continued)

(52) U.S. Cl.
CPC ................ *C08L 67/04* (2013.01); *B32B 9/00* (2013.01); *B32B 27/36* (2013.01); *B65D 1/02* (2013.01);
(Continued)

(58) Field of Classification Search
CPC ........ C08L 67/04; C08L 23/04; C08L 101/16; C08L 2203/10; C08L 2207/062;
(Continued)

(56) References Cited

U.S. PATENT DOCUMENTS

| | | |
|---|---|---|
| 8,420,193 B2 | 4/2013 | Hiruma et al. |
| 9,206,312 B2 | 12/2015 | Hiruma et al. |

(Continued)

FOREIGN PATENT DOCUMENTS

| | | |
|---|---|---|
| JP | 2006-7655 A | 1/2006 |
| JP | 2007-084816 A | 4/2007 |

(Continued)

OTHER PUBLICATIONS

JP2012-193345, English machine translation of Detailed Description.*

(Continued)

*Primary Examiner* — Michael C Miggins
(74) *Attorney, Agent, or Firm* — Sughrue Mion, PLLC

(57) ABSTRACT

A polylactic acid composition including polylactic acid and an ethylene resin, characterized in that the ethylene resin is selected so that a melt flow rate ratio (RMF), defined by the following equation (1): RMF=$A_{PLA}/B_{PE}$ (1) where $A_{PLA}$ represents the melt flow rate of the polylactic acid measured at 210° C. and 2.16 kg, and $B_{PE}$ represents the melt flow rate of the ethylene resin measured at 190° C. and 2.16 kg, in a range of 0.5 to 10 is satisfied. Also disclosed is a stretch-molded bottle formed using the polylactic acid composition. The polylactic acid composition is preferably used in molding a container particularly improved in alkali resistance and environmental stress crack resistance.

5 Claims, 1 Drawing Sheet

(51) Int. Cl.
  *B32B 27/36* (2006.01)
  *B65D 23/02* (2006.01)
  *B65D 1/02* (2006.01)
  *C08L 23/04* (2006.01)
  *C08L 101/16* (2006.01)

(52) U.S. Cl.
  CPC ........... *B65D 1/0215* (2013.01); *B65D 23/02* (2013.01); *C08L 23/04* (2013.01); *C08L 101/16* (2013.01); *C08L 2203/10* (2013.01); *C08L 2207/062* (2013.01); *C08L 2207/066* (2013.01); *Y02W 90/12* (2015.05)

(58) Field of Classification Search
  CPC ..... C08L 2207/066; B32B 9/00; B32B 27/36; B65D 23/02; B65D 1/02; B65D 1/0215; Y02W 90/12
  See application file for complete search history.

(56) References Cited

U.S. PATENT DOCUMENTS

| | | |
|---|---|---|
| 2009/0269527 A1 | 10/2009 | Collias et al. |
| 2015/0030792 A1 | 1/2015 | Ito et al. |

FOREIGN PATENT DOCUMENTS

| | | |
|---|---|---|
| JP | 2007-270076 A | 10/2007 |
| JP | 2008-69345 A | 3/2008 |
| JP | 2008-214624 A | 9/2008 |
| JP | 20009-155516 A | 7/2009 |
| JP | 2009-173916 A | 8/2009 |
| JP | 2010-46852 A | 3/2010 |
| JP | 2011-516718 A | 5/2011 |
| JP | 2012-153795 A | 8/2012 |
| JP | 2012-193345 A | 10/2012 |
| JP | 2013-28811 A | 2/2013 |
| JP | 2013-193336 A | 9/2013 |
| JP | 5390088 B2 | 1/2014 |

OTHER PUBLICATIONS

JP2007-270076, English machine translation of Detailed Description.*
JP2013-193336, English machine translation of Detailed Description.*
Communication dated Nov. 28, 2017 issued by the European Patent Office in counterpart application No. 15832479.8.
International Search Report for PCT/JP2015/072348 dated Sep. 1, 2015 [PCT/ISA/210].

* cited by examiner

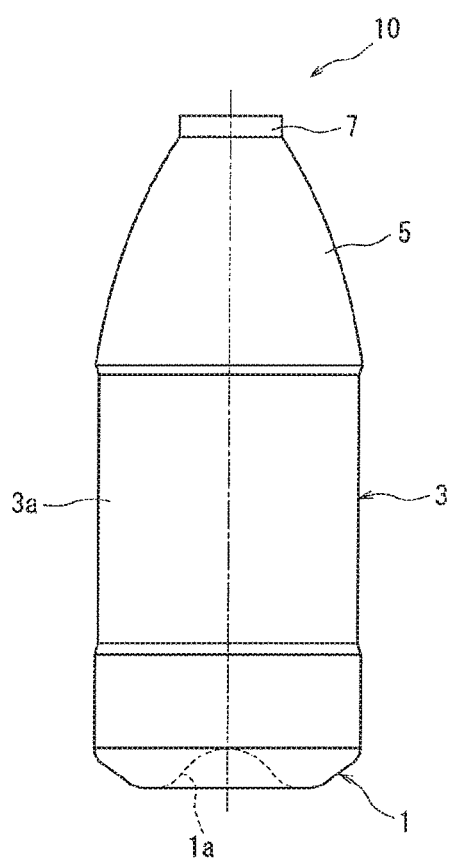

POLYLACTIC ACID COMPOSITION AND STRETCH-MOLDED BOTTLE MOLDED USING SAME

CROSS REFERENCE TO RELATED APPLICATIONS

This application is a National Stage of International Application No. PCT/JP2015/072348, filed on Aug. 6, 2015, which claims priority from Japanese Patent Application No. 2014-164862, filed on Aug. 13, 2014, the contents of all of which are incorporated herein by reference in their entirety.

TECHNICAL FIELD

This invention relates to a polylactic acid composition. More specifically, the invention relates to a polylactic acid composition preferably used in molding a stretch-molded bottle having excellent property in pressure resistance, and a stretch-molded bottle molded using the composition.

BACKGROUND ART

Polylactic acid is a bio-derived resin having biodegradability, and its use in the field of containers, such as bottles, is under consideration from the aspect of environment.

By the way, polylactic acid is weak in alkali resistance as compared with polyester such as polyethylene terephthalate (PET), and has low resistance to environmental stress crack (ESCR) due to internal pressure. These drawbacks hamper its commercialization, particularly, in uses for pressure-resistant bottles to be filled with carbonated beverages.

To improve the properties of films or containers made of polylactic acid, proposals have been made for resin compositions having polyolefins, such as polyethylenes, blended with polylactic acid (see Patent Documents 1 to 7). Even bottles formed from these resin compositions are not satisfactory in resistance to environmental stress crack (ESCR) due to internal pressure.

PRIOR ART DOCUMENTS

Patent Documents

Patent Document 1: Japanese Patent No. 5390088
Patent Document 2: JP-A-2006-7655
Patent Document 3: JP-A-2007-84816
Patent Document 4: JP-A-2008-214624
Patent Document 5: JP-A-2012-153795
Patent Document 6: JP-A-2012-193345
Patent Document 7: JP-T-2011-516718

SUMMARY OF THE INVENTION

Problems to be Solved by the Invention

An object of the present invention is, therefore, to provide a polylactic acid resin composition preferably used in molding a container, improved in properties required of a container such as a bottle, particularly improved in alkali resistance and environmental stress crack resistance.

Another object of the invention is to provide a stretch-molded bottle molded using the above polylactic acid resin composition and improved in environmental stress crack resistance.

Still another object of the invention is to provide a stretch-molded bottle preferably used as a bottle for a carbonated beverage.

Means for Solving the Problems

The present inventors conducted numerous experiments on the environmental stress crack resistance (ESCR) of bottles molded from polylactic acids. As a result, they have found that the environmental stress crack resistance is improved by selecting an ethylene resin having melt flowability at a certain level in comparison with polylactic acid, incorporating a small amount of the ethylene resin into polylactic acid to obtain a polylactic acid composition, and molding a stretched plastic bottle by use of the polylactic acid composition. Based on this finding, they have accomplished the present invention.

According to the present invention, there is provided a polylactic acid composition including a polylactic acid and an ethylene resin, wherein the ethylene resin is selected so that a melt flow rate ratio (RMF), defined by the following equation (1):

$$RMF = A_{PLA}/B_{PE} \qquad (1)$$

where
$A_{PLA}$ represents the melt flow rate of polylactic acid measured at 210° C. and 2.16 kg, and
$B_{PE}$ represents the melt flow rate of the ethylene resin measured at 190° C. and 2.16 kg, in the range of 0.5 to 10 is satisfied.

In the polylactic acid composition of the present invention, it is preferred that
(1) high density polyethylene having a density of 0.942 g/cm³ or more be used as the ethylene resin; and
(2) the ethylene resin be used in an amount of 0.5 to 5.0 parts by mass based on the total amount, 100 parts by mass, of the polylactic acid and the ethylene resin.

According to the present invention, there is also provided a stretch-molded bottle formed using the above polylactic acid composition.

In the stretch-molded bottle, it is preferred that
(1) the polylactic acid composition used here is free of a coloring agent, and the light permeability of the wall of the bottle to light with a wavelength of 500 nm is 85% or less;
(2) when the bottle filled with carbonated water having a carbon dioxide gas volume of 3 GV is maintained at 23° C., and the bottom of the bottle is immersed in an aqueous solution of NaOH in a concentration of 0.2 mass % and at the same temperature, a time elapsing until crack occurrence is observed in the bottom is 15 minutes or more;
(3) a hydrocarbon vapor-deposited (deposited, simply) film is formed on the inner surface of the bottle;
(4) the hydrocarbon deposited film comprises a lower layer located beside the inner surface of the bottle, and an upper layer located on the lower layer, and the lower layer is a layer in which the amount of $CH_2$ observed by FT-IR measurement is larger than in the upper layer; and
(5) the bottle is used for a carbonated beverage.

In the present invention, the amount of a carbon dioxide gas dissolved (carbon dioxide gas dissolved amount, simply) is expressed as a $CO_2$ dissolution volume, and the $CO_2$ dissolution volume at 15.6° C. and 1 atm is defined as 1 GV. That is, a carbon dioxide gas dissolved amount of 3 GV means that $CO_2$ is dissolved in an amount 3 times as large as the $CO_2$ dissolution volume at 15.6° C. and 1 atm.

Effects of the Invention

The polylactic acid composition of the present invention uses a small amount of the ethylene resin having a certain level of melt flow characteristics in comparison with the polylactic acid. Thus, the stretch-molded bottle molded using this polylactic acid composition has excellent properties in alkali resistance, and exhibits excellent environmental stress crack resistance. As will be shown in the Examples to be described later, for example, when the bottle filled with carbonated water having a carbon dioxide gas volume of 3 GV was maintained at 23° C., and its bottom was immersed in an aqueous solution of NaOH in a concentration of 0.2 mass % and at the same temperature, a time elapsing until crack occurrence observed in the bottom (this time may hereinafter be referred to as an environmental stress crack time) was 15 minutes or more, particularly 18 minutes or more. On the other hand, the environmental stress crack time of a bottle formed from polylactic acid alone was less than 15 minutes.

As noted above, the stretch-molded bottle formed using the polylactic acid composition of the present invention has high ESCR characteristics, and is effectively inhibited from cracking due to internal pressure. Hence, such a bottle particularly formed with a hydrocarbon deposited film on its inner surface and thus improved in water barrier properties and gas barrier properties against oxygen or a carbon dioxide gas is preferably used as a bottle for a carbonated beverage.

In the present invention, moreover, a plant-derived ethylene resin can be used as the ethylene resin used in combination with the polylactic acid, and the biomass degree of 100% or almost 100% can be achieved. In addition, the advantage of the polylactic acid to the environment is not impaired.

Furthermore, with the polylactic acid composition of the present invention, a bottle having a special appearance with a softy white tone can be obtained, when high density polyethylene having a density of 0.942 g/cm$^3$ or more is used as the ethylene resin. That is, with such a bottle, the light transmittance of the bottle wall to light with a wavelength of 500 nm is 85% or less. The bottle is useful as a container having high light blocking properties and designed to store liquid contents which prone to deteriorate when exposed to light. Since no coloring agent is added, moreover, the bottle has excellentl recyclability. Besides, such a container, for example, a stretch-molded bottle, is advantageous in that when a hydrocarbon deposited film is provided on its inner surface, the brown color of the deposited film can be effectively hidden, so that a decline in appearance characteristics ascribed to the hydrocarbon deposited film can be effectively avoided.

BRIEF DESCRIPTION OF THE DRAWINGS

FIG. 1 is a side view showing an example of the configuration of a stretch-molded bottle molded using the polylactic acid composition of the present invention.

MODE FOR CARRYING OUT THE INVENTION

<Polylactic Acid Composition>

The polylactic acid composition of the present invention consists mainly of polylactic acid, and has a small amount of an ethylene resin incorporated therein.

1. Polylactic Acid

The polylactic acid used in the present invention may be 100% poly-L-lactic acid or 100% poly-D-lactic acid, or may be a melt blend of poly-L-lactic acid and poly-D-lactic acid, or a random copolymer or block copolymer of L-lactic acid and D-lactic acid.

As long as the biodegradability (enzymatic degradability) or stability of the polylactic acid is not impaired, this polylactic acid may be one having various aliphatic polyhydric alcohols, aliphatic polybasic acids, hydroxycarboxylic acids, lactones, etc. copolymerized therewith.

Examples of the polyhydric alcohols include ethylene glycol, propylene glycol, butanediol, octanediol, dodecanediol, neopentyl glycol, glycerin, pentaerythritol, sorbitan, and polyethylene glycol.

Examples of the polybasic acids include succinic acid, adipic acid, sebacic acid, glutaric acid, decanedicarboxylic acid, cyclohexanedicarboxylic acid, and terephthalic acid. Carboxylic acid diester may also be used.

Examples of the hydroxycarboxylic acids include glycolic acid, hydroxypropionic acid, hydroxyvaleric acid, hydroxycaproic acid, and mandelic acid.

Examples of the lactones include caprolactone, butyrolactone, valerolactone, propiolactone, undecalactone, glycolide, and mandelalide.

Since the polylactic acid composition of the present invention is used for a container typified by a bottle, it uses polylactic acid having melt flow characteristics necessary for molding into a container. For example, one having a melt flow rate (MFR, 210° C., load 2.16 kg) in the range of 3 to 10 g/10 min is used.

2. Ethylene Resin

In the present invention, low density polyethylene, linear low density polyethylene, or medium-density or high density polyethylene is used as the ethylene resin to be blended with the above polylactic acid. As long as the object of the present invention, the object of improving environmental stress crack resistance (ESCR) is not defeated, the ethylene resin may be one having a small amount of an olefin other than ethylene, for example, an α-olefin such as propylene, 1-butene, or 4-methyl-1-pentene, copolymerized therewith.

In the present invention, moreover, it is important that the ethylene resin be selected in accordance with the MFR (melt flow rate) of the polylactic acid used so that a melt flow rate ratio (RMF), defined by the following equation (1):

$$RMF = A_{PLA}/B_{PE} \quad (1)$$

where $A_{PLA}$ represents the melt flow rate of the polylactic acid measured at 210° C. and 2.16 kg, and $B_{PE}$ represents the melt flow rate of the ethylene resin measured at 190° C. and 2.16 kg, is in the range of 0.5 to 10, particularly 1 to 4.

That is, if the RMF value is lower than the above range, the difference in melt flow characteristics between the polylactic acid and the ethylene resin is so great that the dispersion of the ethylene resin in the container wall is poor and, when the container wall is squeezed, delamination may occur. Similarly, if the RMF value is higher than the above range, the difference in melt flow characteristics between the polylactic acid and the ethylene resin is so great that the dispersion of the ethylene resin in the container wall is poor and, when the container wall is squeezed, delamination may also occur.

Furthermore, with the present invention, an ethylene resin having such flow characteristic as to satisfy the above RMF value is selected as the ethylene resin used. Thus the amount of the ethylene resin used needs to be very small. Concretely, the amount of the ethylene resin used should be set at 0.5 to 5.0 parts by mass, particularly preferably 1.0 to 2.5 parts by mass, based on the total amount, 100 parts by mass, of the polylactic acid and the ethylene resin. If the amount of use is large, delamination may occur when the container wall is squeezed. If the amount of use is too small, the alkali resistance or ESCR characteristics of the container molded, for example, a bottle, will be unsatisfactory.

In the present invention, it is preferred that high density polyethylene having a density of 0.942 g/cm$^3$ or more be used as the ethylene resin. A bottle molded using such a high density polyethylene has particularly high light blocking properties and, even if a coloring agent is not added to the composition, the bottle exhibits high light blocking properties such that the light permeability of the bottle wall to light with a wavelength of 500 nm is 85% or less, particularly 70% or less. That is, such a high density polyethylene is dense and has a long molecular chain, thus causing a high degree of light scattering. As a result, even without the addition of a coloring agent, high light blocking properties are believed to be imparted. Since the ethylene resin is dense, moreover, the alkali resistance is further improved and, accordingly, the ESCR characteristics are also enhanced.

If a medium-density or low density polyethylene having a lower density than in the above range is used, for example, the resulting container is semitransparent and, unless a coloring agent is incorporated, it is difficult to obtain high light blocking properties as mentioned above.

Furthermore, the molded container showing high light blocking properties is useful as a container for storing liquid contents to be deteriorated by light, as described earlier. Its high light blocking properties without the addition of a coloring agent, in particular, lead to excellent recyclability. A container, e.g., bottle, having such high light blocking properties can effectively hide the brown color of a hydrocarbon deposited film, when provided on its inner surface, so that it can effectively avoid a decline in the appearance characteristics ascribed to the hydrocarbon deposited film.

In the present invention, it is optimal to use a plant-derived ethylene resin from corn or a sugar cane as the aforementioned ethylene resin. By so doing, the biomass degree of 100% or almost 100% can be achieved. This is very advantageous to the environment.

3. Other Agents Incorporated

In the polylactic acid composition of the present invention, compounding agents publicly known per se, for example, plasticizers, heat stabilizers, light stabilizers, antioxidants, ultraviolet absorbers, flame retardants, colorants such as pigments, fillers, mold releasers, antistats, perfumes, foaming agents, antimicrobial and antifungal agents, compatibilizing agents, and crystal nucleating agents, can be incorporated according to the uses of the molded container.

The above-mentioned polylactic acid composition can be easily prepared by melt-kneading the polylactic acid and the ethylene resin together with various compounding agents to be used if required.

<Stretch-Molded Bottle>

The above polylactic acid composition of the present invention can improve the properties of the polylactic acid by extrusion or injection molding. Thus, it can be applied to various uses in the form of such a shaped product. Particularly when this composition is applied in molding a container, especially, a stretch-molded bottle excellent in alkali resistance and ESCR characteristics, the advantages of the present invention can be exhibited to the maximum.

The typical structure of such a stretch-molded bottle is shown in FIG. 1. Referring to FIG. 1, a stretch-molded bottle indicated entirely at 10 is composed of a bottom 1, a barrel 3 rising from the bottom 1, a shoulder 5 curved upwardly from the upper end of the barrel 3 in an upwardly decreasing diameter, and a neck 7 extending upward from the shoulder 5 and configured to be mounted with a lid such as a cap or a plug.

The stretch-molded bottle 10 can be produced by a method publicly known per se, except for the use of the aforementioned polylactic acid composition.

For example, the stretch-molded bottle 10 can be produced by molding a preform in the shape of a test tube by injection molding using the polylactic acid composition, and then blow molding the preform with heating to a temperature, which is equal to or higher than the glass transition temperature (Tg), but lower than the melting point, while blowing a fluid such as air or a nitrogen gas into the preform, thereby stretching the preform in monoaxial and biaxial directions to impart the shape of a bottle as shown in FIG. 1.

Blow molding is usually performed so that the stretch ratio in the axial direction or in the circumferential direction is a value of the order of 2 to 4. By so doing, oriented crystallization occurs to enhance strength. Further, heat fixing is performed if necessary, whereby heat resistance can be increased. Heat fixing can be performed, for example, by holding the mold temperature during blow molding at a temperature which is equal to or higher than the thermal crystallization temperature, but lower than the melting point, of the polylactic acid (the temperature is, for example, 80 to 100° C.).

The bottle of the present invention, which is obtained by the above blow molding (stretch molding), has the aforementioned ethylene resin dispersed in the polylactic acid. Thus, the bottle is expected to be improved in alkali resistance, which the polylactic acid is poor in, and to be increased in impact resistance to dropping or the like.

The stretch-molded bottle 10 is improved in ESCR properties. Thus, it is preferably used as pressure-resistant bottles to be filled with carbonated beverages, for example, sparkling wine (amount of $CO_2$ dissolved: about 1.5 GV), a weakly carbonated beverage such as Fanta (amount of $CO_2$ dissolved: 2 to 2.2 GV), beer (amount of $CO_2$ dissolved: 2.5 to 3 GV), a strongly carbonated beverage such as cola (amount of $CO_2$ dissolved: 3.5 to 4 GV), and champagne (amount of $CO_2$ dissolved: about 5 GV).

A pressure-resistant bottle to be filled with a carbonated beverage or the like, as mentioned above, is formed with a dome-shaped raised bottom portion 1a at the center of the bottom 1.

In the pressure-resistant bottle as above, moreover, it is preferred to form a hydrocarbon deposited (i.e., vapor-deposited) film on the inner surface of the bottle, in order to improve the barrier properties against oxygen or a carbon dioxide gas and water barrier properties.

The hydrocarbon deposited film is formed by plasma CVD method using a gas of a hydrocarbon compound as a reactant gas. It is sometimes called a diamond-like carbon (DLC) film, and is advantageous in that it can be formed as a film at a lower power output (output, simply) than those of a silicon oxide film. That is, the polylactic acid has a low glass transition temperature (Tg) as compared with a polyester such as PET, and is thus thermally deformed by heat generated during plasma CVD processing for film formation. Hence, it is not suitable for formation thereon of a deposited film of a silicon oxide or the like. A hydrocarbon deposited film, on the contrary, can be formed at a low power output, and is able to prevent the heat deformation induced by heat generated during plasma CVD processing. Hydrocarbon deposited film can therefore be formed on the inner surface of a bottle made of polylactic acid.

As the hydrocarbon compound for use as the reactant gas for plasma CVD, at least one of aliphatic unsaturated hydrocarbons or aromatic hydrocarbons, for example, is used.

Examples of the aliphatic unsaturated hydrocarbons include alkenes such as ethylene, propylene, butene, and pentene; alkynes such as acetylene and methylacetylene; alkadienes such as butadiene and pentadiene; and cycloalkenes such as cyclopentene and cyclohexene. The aromatic hydrocarbons can be exemplified by benzene, toluene, xylene, indene, naphthalene, and phenanthrene. Any one of gases of these compounds may be used alone, or two or more of these gases may be mixed and the resulting mixture can be used as the reactant gas. In the present invention, from the viewpoint of film characteristics, etc., the aliphatic unsaturated hydrocarbon is preferred, and ethylene or acetylene, in particular, is most preferred.

Along with the above-mentioned reactant gas, any of various carrier gases can be used as a diluent to adjust the gas concentration of the reactant gas. Such a carrier gas can be exemplified by an inert gas such as an argon gas or a helium gas.

Incidentally, many OH groups are distributed on the inner surface of the bottle made of the polylactic acid, thus presenting the nature that adhesion to the hydrocarbon deposited film is minimal. With the present invention, however, adhesion to the hydrocarbon deposited film is improved, although reasons for this remain unclear. Even if only an upper layer (barrier layer) is provided, without a deposited lower layer (adhesion layer) having excellent adhesion as will be described below, excellent barrier properties are obtained (a comparison between Experimental Examples 9 and 12). By forming a hydrocarbon deposited film on the inner surface of the bottle, therefore, barrier properties against water, oxygen and a carbon dioxide gas can be effectively enhanced. By being able to provide only the barrier layer, moreover, the productivity of the vapor deposition process is increased.

In the present invention, moreover, in order to further enhance the adhesion between the hydrocarbon deposited film and the inner surface of the bottle, thereby reliably exhibiting the barrier properties ascribed to the hydrocarbon deposited film, it is preferred to configure this hydrocarbon deposited film as a multilayer structure including two layers, a lower layer excellent in adhesion to the inner surface of the bottle made of the polylactic acid (i.e., an adhesion layer), and an upper layer formed on the lower layer and showing barrier properties against water and oxygen (i.e., a barrier layer).

The hydrocarbon deposited film including the layered structure as above is disclosed, for example, in JP-A-2013-193336 proposed by the present applicant. In the hydrocarbon deposited film of the layered structure, the lower layer (adhesion layer) is a layer having a larger $CH_2$ content, as observed by FT-IR measurement, than in the upper layer (barrier layer). The lower layer is formed by film formation at a relatively low power output, whereas the upper layer is formed by film formation at a relatively high power output.

Concretely, the high $CH_2$ content lower layer (adhesion layer) formed on the inner surface of the bottle has a $CH_2$ ratio, to the total amount of CH, $CH_2$ and $CH_3$, of 40% or more, particularly 44% or more, but less than 60%, and usually has a thickness of the order of 5 to 15 nm. In the hydrocarbon deposited film using the above hydrocarbon compound as the reactant gas, peaks derived from CH, $CH_2$, $CH_3$, and $CH_3+CH_2$ appear in a region of the wavenumbers 3200 to 2600 cm-1 in order of increasing wavenumber. In the lower layer with a high $CH_2$ content, the $CH_2$ ratio to the total amount of CH, $CH_2$ and $CH_3$, calculated from these peaks, is within the above-mentioned range, as described in JP-A-2013-193336. Such a lower layer 3a of the high $CH_2$ content contains many highly flexible $CH_2$ bonds and, at the same time, has a loose structure with a small number of molecular branches in the film. This lower layer is formed as a film at a low output, with the decomposition of the polylactic acid molecules (particularly, cleavage at the Ca carbon portion) being suppressed. As a result, such a lower layer is excellent in the adhesion to the surface of the polylactic acid (inner surface of the bottle), and functions as a so-called adhesion layer, thus making it possible to prevent delamination or the like effectively.

On the other hand, the upper layer formed on the above high $CH_2$ content lower layer is low in $CH_2$ content, has a $CH_2$ ratio, to the total amount of CH, $CH_2$ and $CH_3$, of 35% or less, particularly less than 31%, and usually has a thickness of the order of 15 to 100 nm. That is, as described in JP-A-2013-193336, this low $CH_2$ content upper layer is a dense layer formed at a high output and containing many branches as compared with the lower layer. The upper layer of such a nature functions as a barrier layer having high barrier properties against water and oxygen.

According to the present invention, as described above, the barrier properties against a carbon dioxide gas, oxygen and water can be markedly enhanced by forming the hydrocarbon deposited film on the inner surface of the bottle. The hydrocarbon deposited film of the above two-layered structure, in particular, gives high adhesion between the inner surface of the bottle and the hydrocarbon deposited film, thus ensuring effective prevention of delamination or the like and enabling ESCR properties and gas barrier properties to be shown maximally.

If the bottle is formed from the polylactic acid composition containing high density polyethylene as the Polyethylene resin, this bottle has high light blocking properties even without the other addition of a coloring agent. Thus, the bottle can also prevent the decline in the appearance characteristics effectively due to the formation of the hydrocarbon deposited film developing a brown color and, because of no colorant added, it is considered that having excellent another performance in recyclability.

The stretch-molded bottle of the present invention, which is molded using the above polylactic acid composition, is able to use for filling and storing of various contents. In particular, the bottle having the hydrocarbon deposited film formed thereon has markedly high barrier properties against oxygen and water, and can be applied in storing oily contents, for example, oils susceptible to oxidative degradation, such as Japanese deep frying oil, sesame oil, and rapeseed oil, oil-containing hair washes such as shampoos, water-containing oily fluids such as emulsion type dressings, and aqueous contents such as various juices, soy sauce, and sauces. Because of its excellent ESCR properties, in particular, the bottle is applied most preferably for storing carbonated beverages.

EXAMPLES

The present invention will be explained by Experimental Examples to be presented later. Evaluations of various properties in the Experimental Examples were made as follows:

<Evaluation of Light Permeability>

An ultraviolet-visible near infrared spectrophotometer (model: V-570, manufactured by JASCO Corporation)

equipped with an integrating sphere device (model: ISV-470), produced by JASCO Corporation, was used as a measuring device.

A central part of the side wall of an undeposited stretch-molded bottle was cut out, and measured for the light transmission of the side wall to light with a wavelength of 500 nm, by use of the above measuring device. The size of the sample was 15 mm by 30 mm, and light incident direction was from the outer surface of the side bottle wall to inside. The light transmission was 100% when all of light passed through the sample, and 0% when none of light passed through the sample.

<Evaluation of Delamination Properties>

The central part of the side wall of the resulting undeposited stretch-molded bottle was squeezed (pressed and allowed to return to the original state) repeatedly, 10 times, with the finger. Then, the degree of peeling of the squeezed part was evaluated visually for evaluation of delamination properties. The criteria for evaluation were as follows:

○: No delamination observed.

Δ: Slight delamination to an allowable degree.

X: Unallowable clear delamination.

Under the above evaluation criteria, ○ and Δ were taken to be within the permissible range.

<Evaluation of ESCR>

The resulting undeposited stretch-molded bottle was filled with carbonated water cooled to about 5° C., and sealed with a cap to prepare a filled bottle. On this occasion, the carbon dioxide gas volume was adjusted to 3 GV.

Then, the filled bottle was maintained at 23° C., whereafter its bottom was immersed in a 0.2 mass % aqueous solution of sodium hydroxide at 23° C. The amount of time until cracks occurred in the bottom was measured for the evaluation of ESCR (evaluation of environmental stress crack resistance). The criteria for evaluation were as follows:

◎: 20 Minutes or more until cracking.

○: 18 Minutes or more, but less than 20 min, until cracking.

Δ: 15 Minutes or more, but less than 18 min, until cracking.

X: Less than 15 min until cracking.

◎, ○ and Δ were taken to be within the permissible range.

<Evaluation of Water Barrier Properties>

Using each of deposited stretch-molded bottles or undeposited stretch-molded bottles shown in Table 1, filled bottles were prepared in the same manner as for the ESCR evaluation. Each of the filled bottles was measured for mass weight A (g). After storage for 30 days in an atmosphere at 37° C. and a relative humidity of 30%, each filled bottle was measured again for mass weight B (g). The water permeability (%/day) was calculated from the following equation:

Water permeability (%/day)=$(A-B) \times 100/(A \times 30)$

Based on the water permeability calculated as above, the water barrier properties were evaluated under the following criteria:

○: Water permeability of less than 0.06%.

X: Water permeability of 0.06% or more.

<Evaluation of Carbon Dioxide Gas Barrier Properties>

Using each of the deposited stretch-molded bottles or undeposited stretch-molded bottles shown in Table 1, filled bottles were prepared in the same manner as for the ESCR evaluation. Each of the filled bottles was measured for gas volume C by Zahm-Nagel method. After storage for 4 weeks in an atmosphere at 23° C. and a relative humidity of 50%, each filled bottle was measured again for gas volume D. A gas loss was calculated from the following equation:

Gas loss (%)=$(C-D) \times 100/C$

Based on the gas loss calculated above, the carbon dioxide gas barrier properties were evaluated under the following criteria:

○: A gas loss of less than 40%.

X: A gas loss of 40% or more.

Experimental Example 1

The following polylactic acid and ethylene resin were provided:

Polylactic acid (PLA):
Poly-L-lactic acid
Optically active isomer (D-lactic acid) content: 1.4 mass %
MFR: 7 g/10 min (210° C., 2.16 kg)

ethylene resin:
High density polyethylene (HDPE)
Density: 0.964 g/cm$^3$
MFR: 4.5 g/10 min (190° C., 2.16 kg)
RMF: 1.6 (value to the above poly-L-lactic acid)

99 Parts by mass of pellets of the above polylactic acid (poly-L-lactic acid) and 1 part by mass of pellets of the above ethylene resin (high density polyethylene) were dry blended to prepare a polylactic acid composition. This polylactic acid composition was charged into a hopper of an injection molding machine, and a bottomed preform for a pressure-resistant bottle was molded by injection molding.

The resulting preform was subjected to biaxial stretch blow molding at a mold temperature of 85° C. to produce a stretch-molded bottle with a volume of 520 ml. The bottom shape of the stretch-molded bottle was a bottom shape for champagne as shown in FIG. 1.

The resulting stretch-molded bottle was set in a plasma CVD device, and decompress the inside of the bottle and held at a predetermined degree of vacuum for plasma CVD processing Acetylene was used as a reactant gas, and a plasma emission was generated by applying a microwave of 2.45 GHz. Processing was performed for 10 msec at a gas flow rate of 160 sccm and a trigger output of 650 W. Then, processing was performed for 1.5 seconds at the same gas flow rate and an output power of 400 W to provide a first deposited layer (lower layer) of a high $CH_2$ content. Further, processing was performed for 1.0 second at the same gas flow rate and an output power of 1,150 W to provide a second deposited layer (upper layer) of a low $CH_2$ content. In this manner, a deposited stretch-molded bottle was produced.

The first deposited layer (lower layer) had a high $CH_2$ ratio, to the total amount of CH, $CH_2$ and $CH_3$, of 53%, while the second deposited layer (upper layer) had a low $CH_2$ ratio, to the total amount of CH, $CH_2$ and $CH_3$, of 29%. The amounts of CH, $CH_2$ and $CH_3$ were determined by FT-IR measurement.

The unit of the gas flow rate, "sccm", is an abbreviation of "standard cc/min", and represents a value at 1 atm (atmospheric pressure, 1.013 hPa) at 25° C.

The formulation of the polylactic acid composition used in the production of the above bottle is shown in Table 1. The specifications of the bottle (presence or absence of the deposited film) and the evaluations of the various properties made in connection with the bottle are shown in Table 2.

Experimental Examples 2 to 4

Deposited stretch-molded bottles were produced in the same manner as in Experimental Example 1, except that the total amount of the polylactic acid and the ethylene resin was 100 parts by mass, with the amount of the ethylene resin being set as in Table 1. The various properties were evaluated in the same manner as in Experimental Example 1.

The formulations of the polylactic acid compositions used are shown in Table 1, and the specifications and evaluation results of the resulting bottles are shown in Table 2.

Experimental Examples 5 to 7, 13 and 14

Deposited stretch-molded bottles were produced in the same manner as in Experimental Example 1, except that the density and MFR of the ethylene resin (high density polyethylene) used for the preparation of the polylactic acid composition were changed as in Table 1. Evaluations were made in the same manner as in Experimental Example 1.

The formulations of the polylactic acid compositions used are shown in Table 1, and the specifications and evaluation results of the resulting bottles are shown in Table 2.

Experimental Example 8

The following low density polyethylene was provided as the ethylene resin:
Low density polyethylene (LDPE):
Density: 0.916 g/cm$^3$
MFR: 1.0 g/10 min (190° C., 2.16 kg)
RMF: 7.0 (value to the poly-L-lactic acid used in Experimental Example 1)

A deposited stretch-molded bottle was produced in the same manner as in Experimental Example 1, except that the above low density polyethylene was used instead of the high density polyethylene. Evaluations were made in the same manner as in Experimental Example 1.

The formulation of the polylactic acid composition used are shown in Table 1, and the specifications and evaluation results of the resulting bottle are shown in Table 2.

Experimental Examples 9 and 10

A deposited stretch-molded bottle or an undeposited stretch-molded bottle was produced in the same manner as in Experimental Example 1, except that the deposited film was changed as in Table 2. Evaluations were made in the same manner as in Experimental Example 1. In each case, the trigger output during vapor deposition was not performed.

The formulation of the polylactic acid composition used is shown in Table 1, and the specifications and evaluation results of the resulting bottles are shown in Table 2.

Experimental Examples 11 and 12

Deposited stretch-molded bottles were produced in the same manner as in Experimental Example 1, except that the ethylene resin was not incorporated (that is, only 100 parts by mass of the polylactic acid was used), and the deposited film was changed as in Table 2. Evaluations were made in the same manner as in Experimental Example 1. In each case, the trigger output during vapor deposition was not performed.

The formulation of the polylactic acid composition used is shown in Table 1, and the specifications and evaluation results of the resulting bottles are shown in Table 2.

TABLE 1

| | Polylactic acid composition | | | | | |
|---|---|---|---|---|---|---|
| | Polylactic acid | | Ethylene resin | | | |
| | Type | MFR (g/10 min) | Type (parts by mass) | Density (g/cm$^3$) | MFR (g/10 min) | RMF |
| Exp. Ex. 1 | D-la. 1.4% | 7 | HDPE(1) | 0.964 | 4.5 | 1.6 |
| 2 | D-la. 1.4% | 7 | HDPE(0.5) | 0.964 | 4.5 | 1.6 |
| 3 | D-la. 1.4% | 7 | HDPE(2.0) | 0.964 | 4.5 | 1.6 |
| 4 | D-la. 1.4% | 7 | HDPE(5.0) | 0.964 | 4.5 | 1.6 |
| 5 | D-la. 1.4% | 7 | HDPE(1) | 0.956 | 14 | 0.5 |
| 6 | D-la. 1.4% | 7 | HDPE(1) | 0.959 | 0.7 | 10 |
| 7 | D-la. 1.4% | 7 | HDPE(1) | 0.942 | 4.5 | 1.6 |
| 8 | D-la. 1.4% | 7 | LDPE(1) | 0.916 | 1.0 | 7.0 |
| 9 | D-la. 1.4% | 7 | HDPE(1) | 0.964 | 4.5 | 1.6 |
| 10 | D-la. 1.4% | 7 | HDPE(1) | 0.964 | 4.5 | 1.6 |
| 11 | D-la. 1.4% | 7 | only PLA | — | — | — |
| 12 | D-la. 1.4% | 7 | only PLA | — | — | — |
| 13 | D-la. 1.4% | 7 | HDPE(1) | 0.958 | 20 | 0.4 |
| 14 | D-la. 1.4% | 7 | HDPE(1) | 0.959 | 0.55 | 13 |

D-la.: D-lactic acid

TABLE 2

| | Deposited film | | Bottle evaluation | | | | |
|---|---|---|---|---|---|---|---|
| | First layer (lower layer) | Second layer (upper layer) | Light permeability (%) | Delamination | ESCR | Water barrier properties | Carbon dioxide gas barrier properties |
| Exp. Ex. 1 | yes | yes | 70 | ○ | ⊚ | ○ | ○ |
| 2 | yes | yes | 85 | ○ | Δ | ○ | ○ |
| 3 | yes | yes | 45 | ○ | ⊚ | ○ | ○ |
| 4 | yes | yes | 25 | Δ | ⊚ | ○ | ○ |
| 5 | yes | yes | 70 | Δ | ⊚ | ○ | ○ |
| 6 | yes | yes | 70 | Δ | ⊚ | ○ | ○ |
| 7 | yes | yes | 77 | ○ | ⊚ | ○ | ○ |
| 8 | yes | yes | 75 | ○ | Δ | ○ | ○ |
| 9 | no | yes | 70 | ○ | ⊚ | ○ | ○ |
| 10 | no | no | 70 | ○ | ⊚ | X | X |
| 11 | no | no | 98 | ○ | X | X | X |
| 12 | no | yes | 97 | ○ | X | X | X |
| 13 | yes | yes | 73 | X | ○ | ○ | ○ |
| 14 | yes | yes | 72 | X | ○ | ○ | ○ |

EXPLANATIONS OF LETTERS OR NUMERALS

1: Bottom
3: Barrel
5: Shoulder
7: Neck
10: Stretch-molded bottle

The invention claimed is:

1. A stretch-molded bottle for a carbonated beverage, which is formed using a polylactic acid composition, wherein:
   the polylactic acid composition including a polylactic acid and high density polyethylene resin having a density of 0.942 g/cm$^3$ or more,
   the polylactic acid composition contains the high density polyethylene resin in an amount of 1.0 to 2.5 parts by mass based on a total amount, 100 parts by mass, of the polylactic acid and the high density polyethylene resin, and
   the high density polyethylene resin is selected so that a melt flow rate ratio (RMF), defined by the following equation (1):

$$RMF = A_{PLA}/B_{PE} \tag{1}$$

where
   $A_{PLA}$ represents a melt flow rate of the polylactic acid measured at 210° C. and 2.16 kg, and
   $B_{PE}$ represents a melt flow rate of the high density polyethylene resin measured at 190° C. and 2.16 kg,
   in a range of more than 0.5 and less than 10 is satisfied.

2. The stretch-molded bottle for a carbonated beverage according to claim 1, wherein
   the polylactic acid composition used is free of a coloring agent, and
   light permeability of a wall of the bottle to light with a wavelength of 500 nm is 85% or less.

3. The stretch-molded bottle for a carbonated beverage according to claim 1, wherein
   when the bottle filled with carbonated water having a carbon dioxide gas volume of 3 GV is maintained at 23° C., and a bottom of the bottle is immersed in an aqueous solution of NaOH in a concentration of 0.2% by mass and at 23° C., a time elapsing until crack occurrence is observed in the bottom is 15 minutes or more.

4. The stretch-molded bottle for a carbonated beverage according to claim 1, wherein
   a hydrocarbon deposited film is formed on an inner surface of the bottle.

5. The stretch-molded bottle for a carbonated beverage according to claim 4, wherein
   the hydrocarbon deposited film comprises a lower layer located beside the inner surface of the bottle, and an upper layer located on the lower layer, and
   the lower layer is the layer in which an amount of $CH_2$ observed by FT-IR measurement is larger than those of the upper layer.

* * * * *